United States Patent [19]

Hudson

[11] Patent Number: 5,704,961
[45] Date of Patent: Jan. 6, 1998

[54] CORROSION INHIBITORS FOR LIQUID FERTILIZERS

[76] Inventor: Alice P. Hudson, 328 W. 11th St., Riviera Beach, Fla. 33404

[21] Appl. No.: 730,855

[22] Filed: Oct. 17, 1996

[51] Int. Cl.$^6$ .................... C05C 9/00; C09K 3/00; C23F 11/00
[52] U.S. Cl. .................... 71/30; 71/64.1; 71/DIG. 4; 252/387; 422/7
[58] Field of Search .................... 252/387; 422/7, 422/12, 13, 34; 71/28–30, 54, 58, 59, 64.1, DIG. 4

[56] References Cited

U.S. PATENT DOCUMENTS

| | | | |
|---|---|---|---|
| 3,617,240 | 11/1971 | Scott | 71/29 |
| 3,931,029 | 1/1976 | Dutton et al. | 252/76 |
| 4,113,498 | 9/1978 | Rones et al. | 106/14.13 |
| 4,246,030 | 1/1981 | Lipinski | 71/DIG. 4 |
| 4,683,081 | 7/1987 | Kammann et al. | 252/392 |
| 4,781,748 | 11/1988 | Miller et al. | 71/28 |
| 5,176,848 | 1/1993 | Kang et al. | 252/389.62 |
| 5,372,748 | 12/1994 | Schapira et al. | 252/389.23 |
| 5,376,159 | 12/1994 | Cunningham et al. | 71/30 |

FOREIGN PATENT DOCUMENTS 298454  2/1992  Germany.

*Primary Examiner*—Ferris Lander

[57] ABSTRACT

Non-corrosive nitrogen containing fertilizer solutions are provided which contain effective levels of corrosion inhibitors which are monocarboxylic acids or polycarboxylic acids, or their salts, or mixtures thereof.

20 Claims, No Drawings

CORROSION INHIBITORS FOR LIQUID FERTILIZERS

FIELD OF THE INVENTION

This invention relates to corrosion inhibitor additives for nitrogen-containing fertilizer solutions.

BACKGROUND OF THE INVENTION

This invention is directed to compositions to prevent corrosion of metal surfaces of transport, storage, and application equipment by concentrated aqueous fertilizer solutions containing nitrogen compounds including ammonia; ammonium salts such as ammonium nitrate, ammonium sulfate, ammonium phosphate, etc.; nitrates such as potassium nitrate, sodium nitrate, etc.; organic nitrogen based compounds such as urea, ammonium carbamate, etc., and mixtures of these. They may also contain other nutrients or treatment chemicals. Of particular importance are urea-ammonium nitrate (UAN) liquid fertilizers which are produced and sold in large volumes for application to agricultural crops. UAN fertilizers are concentrated water solutions of mixtures of urea and ammonium nitrate usually containing from about 28 to 34% by weight elemental nitrogen, and are usually produced and sold at pH values of 7.5 or less to minimize the content of free ammonia. Free ammonia in high concentrations is undesirable because it is harmful to vegetation and also causes unpleasant ammonia vapors. The solutions are often transported and stored in steel tanks, which corrode very rapidly in the presence of the UAN if no corrosion inhibitor is present. A number of inhibitors have been used in the past, including ammonium phosphates, sulfated organic acids, organic phosphate esters, and sodium molybdate solutions. Several problems have been encountered with previous technology. These have included inadequate corrosion protection resulting in costly repair or replacement of equipment. Also, the organic based inhibitors of the prior art tended to separate from the fertilizer solution resulting in loss of corrosion protection as the solution is transferred in the course of its distribution, and also resulting in the formation of an undesirable surface layer and/or a sludge or sediment which can also contain corrosion products, and which if deposited on vessel surfaces can cause pitting corrosion. Another problem encountered with the organic based inhibitors of the prior art is excessive foaming causing problems in the application of the fertilizer, and also when the solutions are transferred in the course of their distribution, possibly resulting in undesirable release of the solutions to the environment. The corrosion inhibitors must also be non-toxic to plants and must not create an industrial hygiene problem in the fertilizer manufacture or application. The corrosion inhibitors are preferably biodegradable so that their concentration does not build up in the environment.

OBJECTS OF THE INVENTION

The principal object of this invention, therefore, is the provision of effective corrosion inhibitors for nitrogenous fertilizer solutions.

Another object is the provision of corrosion inhibitors which are sufficiently soluble in the nitrogen fertilizer solutions so that they do not separate from the solution in storage or transportation.

A further object is the provision of corrosion inhibitors for nitrogen fertilizer solutions which do not promote foam when the solutions are transferred to transportation equipment or storage vessels or in the application of the fertilizer.

Finally an object is the provision of corrosion inhibitors for nitrogen fertilizer solutions which are non-toxic to plants, do not create industrial hygiene problems, and are biodegradable.

SUMMARY OF THE INVENTION

The present invention provides corrosion inhibitors for liquid fertilizer solutions and particularly UAN solutions which overcome the problems in the prior art. They are superior corrosion inhibitors, they are adequately soluble in the fertilizer solutions and do not separate, they are low foaming, and they do not present toxicity problems. The corrosion inhibitors are certain carboxylic acids or their water soluble salts, or mixtures thereof. The carboxylic acids and salts are chosen from monocarboxylic acids containing from about 7 to about 18 carbon atoms, and at least one alkyl group with at least 6 carbon atoms;

water soluble salts of these monocarboxylic acids;

polycarboxylic acids containing from about 2 to about 3 carboxyl moieties and from about 6 to about 12 carbon atoms per carboxyl moiety, and one alkyl or alkylene group with at least about 6 carbon atoms; and water soluble salts of these polycarboxylic acids.

The corrosion inhibitors are preferably mixtures of polyfunctional carboxylic acids and monofunctional carboxylic acids. To facilitate dispersion, the compositions are preferably added to the aqueous fertilizer solutions as water soluble salts and most preferably as ammonium salts. If adequate mixing is provided they also can be added as free acids which form salts at the pH values of the fertilizer solutions, and thus disperse in and do not separate from the solution. The aliphatic moieties render the corrosion inhibitors surface active in the fertilizer solutions so that they form a molecular film on vessel surfaces, and the anionic carboxyl moieties provide corrosion protection for the metal, usually steel, surfaces.

DESCRIPTION OF THE PREFERRED EMBODIMENTS

The compositions of the liquid fertilizer solutions in which the corrosion inhibitors of this invention are effective can be any that are commonly sold. Fertilizer compositions are typically designated by their N-P-K analysis, which are the weight percentages of N, $P_2O_5$, and $K_2O$ respectively. Typical analyses are for instance 16-0-0, which can be a water solution of 44.2% by weight ammonium nitrate, or a 40% by weight urea solution; 32-0-0, which can be solution containing 44.2% by weight ammonium nitrate and 35.3% by weight urea; 28-0-0, which can be a solution containing 37.8% ammonium nitrate, and 32.1% by weight urea; 13-13-0, which can be a solution containing 24.9% by weight ammonium nitrate, 5.8% by weight mono-ammonium phosphate, and 17.8% by weight diammonium phosphate; 12-20-0, which can be a solution containing 11.5% by weight urea, 8.9% by weight monoammonium phosphate, and 27.4% by weight diammonium phosphate; and 12-6-6, which is can be a solution containing 14.0% by weight ammonium nitrate, 11.2% by weight urea, 2.7% by weight monoammonium phosphate, 8.2% by weight diammonium phosphate, and 9.7% by weight potassium chloride. The solutions may also contain other nutrients or treatment chemicals such as pesticides. Liquid nitrogen fertilizers containing 28 to 32% N from solutions of urea and ammonium nitrate (UAN) are widely used in agricultural applications.

The corrosion inhibitors are mono- or polyfunctional carboxylic acids, or mixtures thereof. Suitable acids are adequately soluble or dispersible in the fertilizer solutions so that they do not readily separate from the fertilizer solution in transportation or storage and are not depleted on transfer of the fertilizer solution from one vessel to another. Suitable acids must also possess surface activity in the fertilizer solutions so that they spontaneously form a corrosion inhibiting film on the metal surfaces to be protected. To provide adequate surface activity the acids must contain an aliphatic hydrocarbyl moiety containing at least about six carbon atoms. The acids can contain unsaturation, and the aliphatic portion can be branched or straight chain. Mixtures of the above described acids are included. Mixtures which contain both monocarboxylic acids and polycarboxylic acids are preferred.

In the preferred compositions the monocarboxylic acids and polycarboxylic acids can be present in any ratio. The preferred ratios are determined by a number of factors including the viscosity of the resulting mixture, the corrosion protection afforded, the dispersibility of the inhibitor composition in the fertilizer solutions, and the cost effectiveness of the acids used.

The monocarboxylic acids can contain from about 7 to about 18 carbon atoms. Acids containing straight chain saturated hydrocarbyl moieties with more than about 12 carbon atoms have limited solubility in this application and are less preferred. Suitable monocarboxylic acids of this invention include n-heptanoic acid, neoheptanoic acid, n-octanoic acid, isooctanoic acid, n-nonanoic acid, isononanoic acid, n-decanoic acid, neodecanoic acid, neotridecanoic acid, coconut fatty acid, oleic acid, and tall oil fatty acid. Straight chain acids containing 7 to 12 carbon atoms are preferred.

Polyfunctional carboxylic acids of this invention contain from about 2 to 3 carboxyl moieties and from about 6 to about 12 carbon atoms per carboxyl moiety. Suitable polycarboxylic acids of this invention include the acrylic acid Diels-Alder adduct of conjugated linoleic acid (DIACID from Westvaco Corp., Charleston S.C.), the maleic anhydride Diels-Alder adduct of conjugated linoleic acid, the alkene "ene" adducts of maleic anhydride with unconjugated linoleic acid, oleic acid, and other monounsaturated tall oil fatty acids, and mixtures of the maleic anhydride Diels-Alder adduct of conjugated linoleic acid and the alkene "ene" adducts of maleic anhydride with unconjugated linoleic acid, oleic acid, and other mono unsaturated tall oil fatty acids (TENAX 2010 from Westvaco Corp.), dodecanedioic acid, octyl succinic acid, octenyl succinic acid, decyl succinic acid, decenyl succinic acid, dodecyl succinic acid, dodecenyl succinic acid, tripropylene succinic acid, and alkenyl succinic acids resulting from the reaction of olefins with internal unsaturation and containing up to 18 carbon atoms with maleic anhydride. Preferred polycarboxylic acids are DIACID and TENAX 2010.

The corrosion inhibitors can be added to the fertilizer solutions in the acid form if sufficient agitation to assure complete dispersion is used. TENAX 2010 and the alkyl and alkenyl succinic acids can be added as the anhydrides, which readily hydrolyze to the acid form in the fertilizer solutions. To render the corrosion inhibitors readily dispersible in the fertilizer solutions they are preferably added as aqueous solutions of water soluble salts. Suitable salts include the alkali metal salts and ammonium and substituted ammonium salts. Most preferred are the ammonium salts. The concentration of the water solutions of the inhibitor salts is not critical. Solutions with less than about 20% water by weight may be gelled or too viscous to pump or disperse in the fertilizer solution, and solutions with more than about 70% water become less economical to transport from the manufacturing site to the user. Solutions containing from about 25% to about 60% water by weight are preferred.

The corrosion inhibitors are added to the fertilizer solutions at levels adequate to control the corrosion in the system of interest. The necessary levels will depend upon the materials of construction of the transportation, storage, and application equipment to be protected. Generally the levels will be between about 50 and 500 ppm by weight based on the weight of the total acid content in the corrosion inhibitor.

This invention is also directed to a method of preventing corrosion of metal surfaces by liquid fertilizer solutions that involves dispersing mono- or polycarboxylic acids or mixtures thereof, or aqueous solutions of water soluble salts thereof into the fertilizer by any suitable mixing or dispersing method. A preferred method of dispersion involves the metering of the corrosion inhibitor into the fertilizer solution upstream from a static in-line mixer or on the suction (low pressure) side of a booster pump.

The following examples are provided to illustrate the preferred compositions, the preferred method of preparation, and comparative evaluations. In these examples all percentages are by weight based on the total weight of all components in the described compositions.

EXAMPLE 1

100 g of TENAX 2010 and 100 g of coconut fatty acid (EMERY 621 from Henkel Corp. Emery Group, Cincinnati, Ohio) were mixed together, and 100 g of water were added thereto. While cooling in an ice bath to keep the temperature under 50° C., an amount of 76.5 g of 28% aqueous ammonia was added with stirring. The resulting product, which contained 53% by weight mixed fatty acids, was a clear viscous solution. The viscosity was 1100 centipoise and the pH of a 1:10 dilution was 8.1.

EXAMPLE 2

100 g of TENAX 2010 and 100 g of mixed $C_7$–$C_9$ straight chain acids (EMERY 1210) were mixed together. The resulting product is a clear viscous liquid.

EXAMPLE 3

An amount of 32.4 g of EMERY 1210 was mixed with 8.3 g of water, and 26.9 g of 28% aqueous ammonia was added to the mixture with cooling and stirring. After the ammonia addition, an amount of 32.4 g of TENAX 2010 was added with stirring. The final mixture contained 65% by weight of the mixed fatty acids. The pH of a 1/10 dilution was 7.4. The viscosity 160 centipoise.

EXAMPLE 4

70 g of n-nonanoic acid and 30 g of DIACID were mixed together. The resulting mixture was a low viscosity liquid which dispersed readily in UAN solutions with moderate agitation.

EXAMPLE 5

70 g of n-nonanoic acid and 30 g of decenyl succinic anhydride were mixed together. The resulting mixture was a very low viscosity liquid which dispersed readily in UAN solutions with moderate agitation.

Comparative Example 6

N-SURE 202 is a phosphate ester corrosion inhibitor from Petrolite Specialty Polymers Group, Tulsa, Okla.

Corrosion tests using the compositions of Examples 1–6 were conducted as follows: UAN fertilizer solutions containing no corrosion inhibitor were supplied by fertilizer manufacturers or were prepared in the laboratory by adding the appropriate quantities of fertilizer grade urea and ammonium nitrate granules to water with stirring and slight heating to speed the dissolution. The resulting solution was mixed with activated carbon and filtered to remove any surface treatments that may have been present on the fertilizer granules. The pH was adjusted if necessary with aqueous ammonia or concentrated nitric acid. For each test, 300 g of the UAN solution was weighed into an 8 oz. wide mouth glass jar.

The appropriate quantities of corrosion inhibitors, which are noted in the Tables below as ppm on a weight basis in the fertilizer solution, were added to the UAN solutions in the test jars with a microliter pipet, and blended into the solution with a Tekmar Homogenizer (Tekmar Company, Cincinnati, Ohio).

One inch×4 inch by 1/32 inch 1010 carbon steel coupons were degreased by immersion in toluene, air dried, and weighed accurate to 0.1 mg. Immediately prior to immersion in the UAN solutions the coupons were activated for 30 seconds in a 10% HCl solution in 50:50 methanol-water and allowed to drain. After submerging the coupons in the UAN solutions the jars were capped and stored at ambient temperature and for the test period.

When the tests were completed, the coupons were removed from the UAN solutions and any surface deposits were removed by immersing the coupon in a dilute HCl solution inhibited with a few drops of a branched amine. The coupons were dried and reweighed, and the weight loss was converted to mils per year (mpy) based on the surface area of the coupons, the density of the steel, and the length of the test. The results of these corrosion tests are shown in Tables 1–5. In these tables the inhibitor level indicated is determined on the basis of the carboxylic acids present in the compositions.

Test 1

28%N UAN was prepared by the laboratory procedure described above, and adjusted to pH 7.2. Tests were conducted as described for 17 days at ambient temperature. The results are shown in Table 1.

TABLE 1

| Corrosion inhibitor | Level, ppm | Corrosion, mils per year |
|---|---|---|
| None | — | 58 |
| Comparative Example 6 | 50 | 11.2 |
|  | 100 | 2.1 |
| Diacid | 50 | 0.7 |
|  | 100 | 1.2 |
| n-nonanoic acid | 50 | 11 |
|  | 100 | 1.1 |
| Decenyl succinic acid | 50 | 0.9 |
|  | 100 | 1.1 |
| Composition of Example 4 | 67 | 0.1 |
| Composition of Example 5 | 36 | 0.2 |
|  | 48 | 0.2 |

These results show that the monocarboxylic acids and the polycarboxylic acids of this invention have corrosion inhibiting properties and that the mixtures of mono- and polycarboxylic acids (compositions of Examples 4 and 5) are superior.

Test 2

28% N UAN was prepared by the laboratory procedure described above, and adjusted to pH 7.2. Tests were conducted as described for the period of time noted in the table, at ambient temperature. The results are shown in Table 2.

TABLE 2

| Corrosion inhibitor | Level, ppm | Duration, Days | Corrosion, mils per year |
|---|---|---|---|
| none |  | 4 | 45 |
|  |  | 20 | 64 |
|  |  | 36 | 59 |
| ammonium salt of octenyl succinic acid | 100 | 4 | 1.2 |
|  |  | 20 | 0.1 |
|  |  | 36 | 0.1 |
| ammonium salt of decenyl succinic acid | 100 | 4 | 0.3 |
|  |  | 20 | 0.1 |
|  |  | 36 | 0.05 |
| ammonium salt of dodecenyl succinic acid | 100 | 4 | 1.7 |
|  |  | 20 | 5.6 |
|  |  | 36 | 24 |

This data shows that as the chain length of the alkyl moiety increases the acids become less soluble in the UAN the corrosion inhibition is poorer.

Test 3

32% N UAN containing no corrosion inhibitor was obtained from a producer, and adjusted to pH 7.2. Tests were conducted as described for the period of time noted in the table, at 30° C. The results are shown in Table 3.

TABLE 3

| Corrosion inhibitor | Level, ppm | Duration, Days | Corrosion, mils per year |
|---|---|---|---|
| None |  | 14 | 53 |
|  |  | 28 | 85 |
| Comparative Example 6 | 150 | 14 | 30 |
|  |  | 28 | 7.6 |
| Composition of Example 2 | 150 | 14 | 0.06 |
|  |  | 28 | 0.03 |

This data shows good corrosion protection at higher temperatures of storage.

Test 4

32% N UAN containing no corrosion inhibitor was obtained from a producer, and adjusted to pH values as noted in the table. Tests were conducted as described for the period of time noted in the table, at ambient temperature. The results are shown in Table 4.

TABLE 4

| Corrosion inhibitor | Level, ppm | pH | Duration, Days | Corrosion, mils per year |
|---|---|---|---|---|
| None |  | 7.2 | 7 | 16 |
|  |  |  | 30 | 19 |
| Composition of Example 2 | 100 | 7.2 | 7 | 0.2 |
|  |  |  | 30 | 0.2 |
| None |  | 7.0 | 7 | 14 |
|  |  |  | 30 | 12 |
| Composition of Example 2 | 100 | 7.0 | 7 | 0.3 |
|  |  |  | 30 | 2.0 |
| None |  | 6.8 | 7 | 15 |
|  |  |  | 30 | 11 |
| Comparative Example 6 | 100 | 6.8 | 7 | 10 |
|  |  |  | 30 | 8 |
| Composition of Example 2 | 100 | 6.8 | 7 | 0.3 |
|  |  |  | 30 | 2.3 |

This data shows that corrosion protection is retained at lower pH values, which would result if the solutions were stored for long periods and the ammonia was allowed to vent.

Test 5

To demonstrate that the corrosion inhibitor remains in solution and is not lost when the fertilizer solution is transferred from one vessel to another, corrosion tests were conducted on freshly prepared solutions containing inhibitor, and 300 g of the same solutions were stored in 8 oz glass bottles for 30 days, at which time the solution was transferred to a new bottle, and corrosion tests of the solutions were repeated. 32% N UAN was prepared by the laboratory procedure described above, and adjusted to pH 7.2. Tests were conducted as described for 30 days, at ambient temperature. The results are shown in Table 5.

TABLE 5

| Corrosion inhibitor | Level ppm | Corrosion, mils per year | |
|---|---|---|---|
| | | Immediate | After 30 days |
| None | | 67 | 52 |
| Composition of Example 1 | 50 | 0.01 | 0.01 |
| | 100 | 0.00 | 0.2 |
| | 150 | 0.00 | 0.01 |
| Composition of Example 3 | 50 | 0.01 | 0.05 |
| | 100 | 0.6 | 0.01 |
| | 150 | 0.00 | 0.03 |

Corrosion inhibition activity was still excellent after storage and transfer of the solution, indicating that the inhibitor remained in solution.

EXAMPLE 7

To demonstrate the low foaming properties of the inhibitors of this invention, the following tests were conducted:

A. Air was bubbled through a capillary tube at the rate of 2 liters/min into 250 g of 32% N UAN solution, containing inhibitors at the levels noted, in a 500 ml graduate. The amount of foam generated was measured when the level of foam had reached a steady state.

B. In the second foam test, the UAN solution containing the corrosion inhibitor was recirculated at a rate of about 1 gal/min through a 1 l graduated cylinder connected to a centrifugal pump. Foam was generated by a 12 inch drop from a 3/16 inch i.d. glass tube to the surface of the solution in the graduate. When the foam had reached a steady state the foam heights was noted.

The results of the foam tests are shown in Table 6.

TABLE 6

| Inhibitor | Level, ppm | Milliliters of foam | |
|---|---|---|---|
| | | Test A | Test B |
| Comparative Example 6 | 100 | 20 | 125 |
| Composition of Example 1 | 100 | 20 | 70 |
| Composition of Example 3 | 100 | 15 | 100 |
| Comparative Example 6 | 300 | 20 | 125 |
| Composition of Example 1 | 300 | 20 | 80 |
| Composition of Example 3 | 300 | 15 | 100 |

EXAMPLE 8

To demonstrate the surface activity of the inhibitors of this invention in UAN solutions, the inhibitor of Example 4 was added at the level of 150 ppm to both 28% N UAN and 32% N UAN. The dynamic surface tension was measured with a SensaDyne 6000 Tensiometer (SensaDyne Instrument Div., Milwaukee Wis.). To further demonstrate that the corrosion inhibitor did not separate from the solution on storage, the surface tension was measured again after the solutions had sat for 105 days. The results are shown in Table 7.

TABLE 7

| Solution | Surface tension, dynes/cm | |
|---|---|---|
| | Immediate | After 105 days |
| 28% N UAN, no inhibitor | 70.1 | |
| 32% N UAN, no inhibitor | >72 | |
| 28% N UAN with 150 ppm inhibitor of Example 4 | 51.1 | 54.9 |
| 32% N UAN with 150 ppm inhibitor of Example 4 | 60.9 | 62.4 |

The results show a significant reduction in surface tension on adding the inhibitor and also show that the surface tension (and thus the inhibitor in solution) does not change significantly on standing.

The invention can be embodied in other forms without departing from the spirit or the essential attributes thereof. Particularly it will be appreciated by those skilled in the art that alternative carboxylic acids to those disclosed herein could have utility in the invention. Reference should therefore be had to the following claims, rather than to the foregoing specification, to determine the scope of the invention.

The embodiments of the invention in which an exclusive property or privilege is claimed are defined as follows:

1. An aqueous fertilizer composition comprised of at least one nitrogenous compound which is useful as a plant fertilizer and a corrosion inhibiting amount of at least one corrosion inhibitor selected from the group consisting of monocarboxylic acids containing from about 7 to about 18 carbon atoms and at least one alkyl group with at least 6 carbon atoms;

water soluble salts of said monocarboxylic acids;

polycarboxylic acids containing from about 2 to about 3 carboxyl moieties and from about 6 to about 12 carbon atoms per carboxyl moiety, said polycarboxylic acids having at least one group selected from alkyl or alkylene radicals with at least about 6 carbon atoms; and water soluble salts of said polycarboxylic acids.

2. The composition of claim 1 wherein the corrosion inhibitor comprises a mixture of said monocarboxylic acids and said polycarboxylic acids.

3. The composition of claim 1 wherein the corrosion inhibitor comprises a mixture of said water soluble salts of monocarboxylic acids and said water soluble salts of polycarboxylic acids.

4. The composition of claim 3 wherein said water soluble salts are ammonium salts.

5. The composition of claim 1 wherein the corrosion inhibitor comprises at least one polycarboxylic acid.

6. The composition of claim 1 wherein the corrosion inhibitor comprises a reaction product of a fatty acid chosen from the group consisting of conjugated linoleic acid, unconjugated linoleic acid, and monounsaturated tall oil fatty acids, and a reactant selected from the group consisting of acrylic acid, maleic acid, maleic anhydride, and fumaric acid.

7. The composition of claim 1 wherein the corrosion inhibitor comprises a polycarboxylic acid chosen from the group consisting of alkyl and alkenyl succinic acids.

8. The composition of claim 2 wherein the polycarboxylic acid comprises a reaction product of a carboxylic acid chosen from the group consisting of conjugated linoleic acid, unconjugated linoleic acid, and monounsaturated tall oil fatty acids, and a reactant selected from the group consisting of acrylic acid, maleic acid, maleic anhydride, and fumaric acid.

9. The composition of claim 2 wherein the polycarboxylic acid is selected from the group consisting of alkyl and alkenyl succinic acids.

10. The composition of claim 2 wherein the monocarboxylic acid is coconut fatty acid and the polycarboxylic acid is mixtures of the maleic anhydride Diels-Alder adduct of conjugated linoleic acid and the alkene "ene" adducts of maleic anhydride with conjugated linoleic acid, oleic acid and other mono unsaturated tall oil fatty acids.

11. A method of reducing the corrosivity of aqueous nitrogenous fertilizer compositions on metals comprising adding to said fertilizer composition at least one corrosion inhibitor chosen from the group consisting of monocarboxylic acids containing from about 7 to about 18 carbon atoms, and at least one alkyl group with at least 6 carbon atoms;

water soluble salts of said monocarboxylic acids; polycarboxylic acids containing from about 2 to about 3 carboxyl moieties and from about 6 to about 12 carbon atoms per carboxyl moiety, said polycarboxylic acids having at least one group selected from alkyl or alkylene radicals with at least about 6 carbon atoms; and water soluble salts of said polycarboxylic acids;

in an amount sufficient to substantially inhibit corrosion of metal surfaces which come in contact with said fertilizer compositions.

12. The method of claim 11 wherein the corrosion inhibitor comprises a mixture of said monocarboxylic acids and said polycarboxylic acids.

13. The method of claim 11 wherein the corrosion inhibitor comprises a mixture of said water soluble salts of monocarboxylic acids and said water soluble salts of polycarboxylic acids.

14. The method of claim 13 wherein said water soluble salts are ammonium salts.

15. The method of claim 11 wherein the corrosion inhibitor comprises at least one polycarboxylic acid.

16. The method of claim 11 wherein the corrosion inhibitor comprises a reaction product of a fatty acid chosen from the group consisting of conjugated linoleic acid, unconjugated linoleic acid, and monounsaturated tall oil fatty acids, and a reactant selected from the group consisting of acrylic acid, maleic acid, maleic anhydride, and fumaric acid.

17. The method of claim 11 wherein the corrosion inhibitor comprises a polycarboxylic acid chosen from the group consisting of alkyl and alkenyl succinic acids.

18. The method of claim 12 wherein the polycarboxylic acid comprises a reaction product of a carboxylic acid chosen from the group consisting of conjugated linoleic acid, unconjugated linoleic acid, and monounsaturated tall oil fatty acids, and a reactant selected from the group consisting of acrylic acid, maleic acid, maleic anhydride, and fumaric acid.

19. The method of claim 12 wherein the polycarboxylic acid is selected from the group consisting of alkyl and alkenyl succinic acids.

20. The method of claim 12 wherein the monocarboxylic acid is coconut fatty acid and the polycarboxylic acid is mixtures of the maleic anhydride Diels-Alder adduct of conjugated linoleic acid and the alkene "ene" adducts of maleic anhydride with conjugated linoleic acid, oleic acid and other mono unsaturated tall oil fatty acids.

* * * * *